Figure 1:
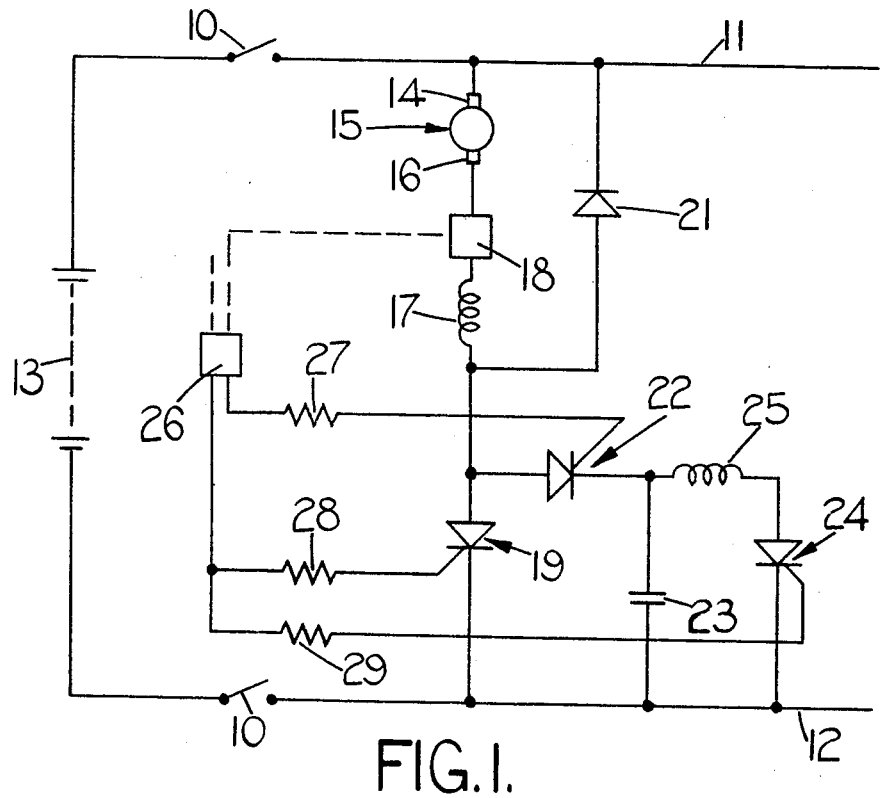

United States Patent [19]
Wright

[11] 3,949,284
[45] Apr. 6, 1976

[54] CONTROL CIRCUITS FOR ELECTRICALLY DRIVEN VEHICLES

[75] Inventor: Maurice James Wright, Birmingham, England

[73] Assignee: Joseph Lucas (Industries) Limited, Birmingham, England

[22] Filed: June 14, 1974

[21] Appl. No.: 479,553

[30] Foreign Application Priority Data
June 30, 1973 United Kingdom............... 31307/73
June 30, 1973 United Kingdom............... 31306/73

[52] U.S. Cl................................ 318/257; 318/283
[51] Int. Cl.²........................................... H02P 5/06
[58] Field of Search........... 318/139, 256, 257, 264, 318/268, 269, 277, 283–285, 484, 549

[56] References Cited
UNITED STATES PATENTS

| | | | |
|---|---|---|---|
| 2,774,926 | 12/1956 | Gilman et al. ...................... | 318/284 |
| 3,114,871 | 12/1963 | Schenkelberger .................. | 318/257 |
| 3,568,024 | 3/1971 | Robbins............................. | 318/257 |

*Primary Examiner*—Robert K. Schaefer
*Assistant Examiner*—W. E. Duncanson, Jr.
*Attorney, Agent, or Firm*—Holman & Stern

[57] ABSTRACT

A control circuit for an electrically driven vehicle has a switch with a central off position, and operative positions in which the motor of the vehicle drives the vehicle forwardly and rearwardly. Delay means is provided operable when the switch is in its central off position for maintaining energisation of the control circuit for a predetermined period of time, so that loads are not deenergised as the switch is moved through its off position to change the direction of operation of the truck. In the preferred form, movement of the switch to its off position reduces the demanded armature current to zero.

7 Claims, 5 Drawing Figures

CONTROL CIRCUITS FOR ELECTRICALLY DRIVEN VEHICLES

This invention relates to control circuits for electrically driven vehicles.

A circuit according to the invention comprises a traction motor for driving the vehicle, a regulator in circuit with the motor armature for controlling the armature current, switch means having forward and reverse positions in which the motor operates to drive the vehicle forwardly and rearwardly respectively, and an off position, the switch means also controlling the power supply to the circuit and so serving to de-energise the circuit when in its off position, delay means being provided for maintaining energisation of the circuit for a period of time when the switch means is moved to the off position.

Preferably, the motor armature current is set by the accelerator pedal of the vehicle, and there is further provided an overriding control operable when the switch means is in its off position for reducing the armature current to a predetermined level.

Preferably, the predetermined level is zero.

In the preferred form of the invention in which the switch means controls contactors determining the direction of operation of the motor, further delay means is provided for holding the contactors closed for a predetermined period of time during which the current can reduce to the predetermined level. Preferably, the further delay means allows the contactors to open during the predetermined period of time if the armature current falls to a predetermined level.

Figures 2, 3, 4:
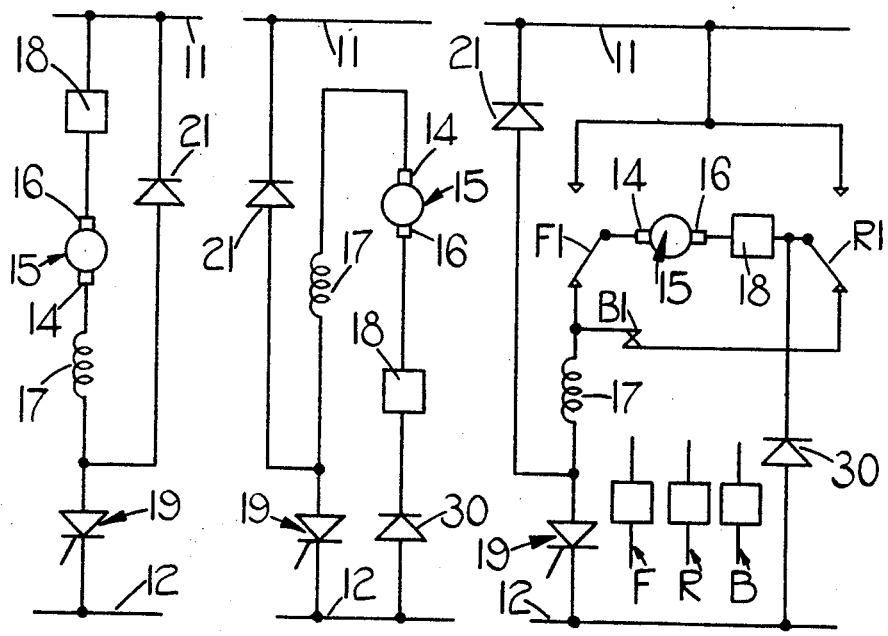

An example of the invention is illustrated in the accompanying drawings, in which:

FIGS. 1 to 3 are circuit diagrams of a control circuit for an electrically driven vehicle, showing three alternative connections of the circuit, FIG. 4 illustrates one arrangement of contactors for producing the connections shown in FIGS. 1 to 3, and FIG. 5 is a circuit diagram of one form of control arrangement for use in FIGS. 1 to 4.

Referring first to FIG. 1, there are provided positive and negative supply lines 11, 12 connected through contacts 10 to the traction battery 13 of the vehicle. Typically, the battery 13 has a voltage in excess of 200 volts. Connected to the line 11 is one end 14 of the armature of a series wound traction motor 15, the other end 16 of the armature being connected to the line 12 through a series circuit including a current sensing device 18, the field winding 17 of the motor 15 and the anode-cathode path of a thyristor 19. The series combination of armature, device 18 and winding 17 is bridged by a freewheel diode 21, and the junction of the winding 17 and thyristor 19 is connected to the anode of a thyristor 22, the cathode of which is connected to the line 12 through a capacitor 23. The capacitor 23 is bridged by an inductor 25 and the anode-cathode path of a thyristor 24 in series. The thyristors 19 and 24 have their gates connected through resistors 28, 29 respectively to one output terminal of a control unit 26, the unit 26 having a second output terminal which is connected through a resistor 27 to the gate of the tyristor 22.

FIG. 1 shows the circuit connections when the vehicle is being driven in a forward direction. The accelerator pedal of the vehicle operates a potentiometer which produces an output representing the demand current level in the motor. This output signal is converted to two signals representing an upper current level and a lower current level respectively, and these two signals are sensed by the control unit 26, which also receives a signal from the device 18. When the current flow in the motor reaches the upper level, the thyristor 19 is turned off, and when the current flow falls to the lower level, the thyristor 19 is turned on again. The operation of the circuit to control the thyristor 19 is best explained by commencing at a point in the cycle of operations when the thyristors 19 and 24 are off, and the thyristors 22 is conducting and charging the capacitor 23. When the capacitor 23 is charged, current flow through the thyristor 22 reduces to zero and so the thyristor 22 turns off. Since the thyristor 19 is not conducting, the current flow in the device 18 will be decreasing, and when the current reaches the lower level, the unit 26 produces an output to turn on the thyristor 19 and the thyristor 24. Conduction of the thyristor 24 causes the charge on the capacitor 23 to be reversed, after which the thyristor 24 turns off. The capacitor 23 is now charged with its lower plate positive and its upper plate negative. Conduction of the thyristor 19 causes current to increase in the armature 15 and the winding 17, and the current flowing in the device 18 now increases until it reaches the upper level. When this upper level is reached, the control unit 26 produces an output to turn on the thyristor 22, permitting discharge of the capacitor 23 with the result that the thyristor 19 is turned off. The capacitor 23 now charges again through the thyristor 22 and the cycle is repeated.

In the arrangement being described, it is also possible to use the motor to brake the vehicle electrically, and to use the motor to drive the vehicle in reverse. FIG. 1 does not show the various contactor arrangements which are used for this purpose, but FIGS. 2 and 3 show the circuit connections when these contactors are in the appropriate position. Thus, FIG. 2 shows the arrangement when the vehicle is to be driven in reverse. The circuit connections are the same as in FIG. 1, except that the end 16 of the motor 15 is now connected to the line 11 through the device 18 and the other end 14 is connected to the winding 17. The operation is exactly the same as in FIG. 1, except that the motor is driven in the reverse direction.

FIG. 3 shows the circuit connections when the motor is being used to brake the vehicle electrically. The end 14 of the motor is connected to the winding 17 as in FIG. 2, but the end 16 is now connected to the line 12 through the device 18 and an additional diode 30 in series. When the motor is being used to brake the vehicle, the potentiometer operated by the accelerator pedal is inoperative, but another potentiometer is operated by the brake pedal, and provides a signal to the unit 26 in exactly the same way as the potentiometer operated by the accelerator pedal. Thus, the current in the motor armature will be controlled in the same way as described with reference to FIG. 1. In this case, however, the motor 15 acts as a generator and charges the battery by way of the diodes 21 and 30.

There are various contactor arrangements that can be used to produce the arrangements shown in FIGS. 1 to 3, but one possible arrangement is shown in FIG. 4. The basic controls of the vehicle are the accelerator pedal, which when depressed operates a potentiometer as previously explained, the brake pedal which operates another potentiometer and also provides normal hydraulic braking for the vehicle, and a selector switch which has a central off position but is movable in opposite directions from the off position to select forward or reverse movement of the vehicle. In FIG. 4 three contactor operating devices F, R, B are shown. If the selector switch is in the forward position and the accelerator pedal is depressed, the device F will be energised and will operate a contact F1 which normally occupies the position shown in the drawing but when the device F is energised moves to its alternative position in which it connects the circuit in the manner indicated in FIG. 1. If, on the other hand, the selector switch is moved to its reverse position and the accelerator pedal is depressed, then the device R is energised and a contact R1 is moved from the position shown to its alternative position, at which point the circuit is in the form indicated in FIG. 2.

If the selector switch is in its forward position, but the brake pedal is depressed, then normal hydraulic braking is provided, but in addition the device B is energised to open the contact B1. The contacts F1 and R1 will be in the positions shown, and so it will be seen that the circuit now has the form shown in FIG. 3, so that electrical braking is provided as explained above.

Although the arrangements shown in FIGS. 1 to 4 relate to a series motor, they can also be applied to shunt and compound motors. In this case, the arrangements described will control the armature current.

Figure 5:
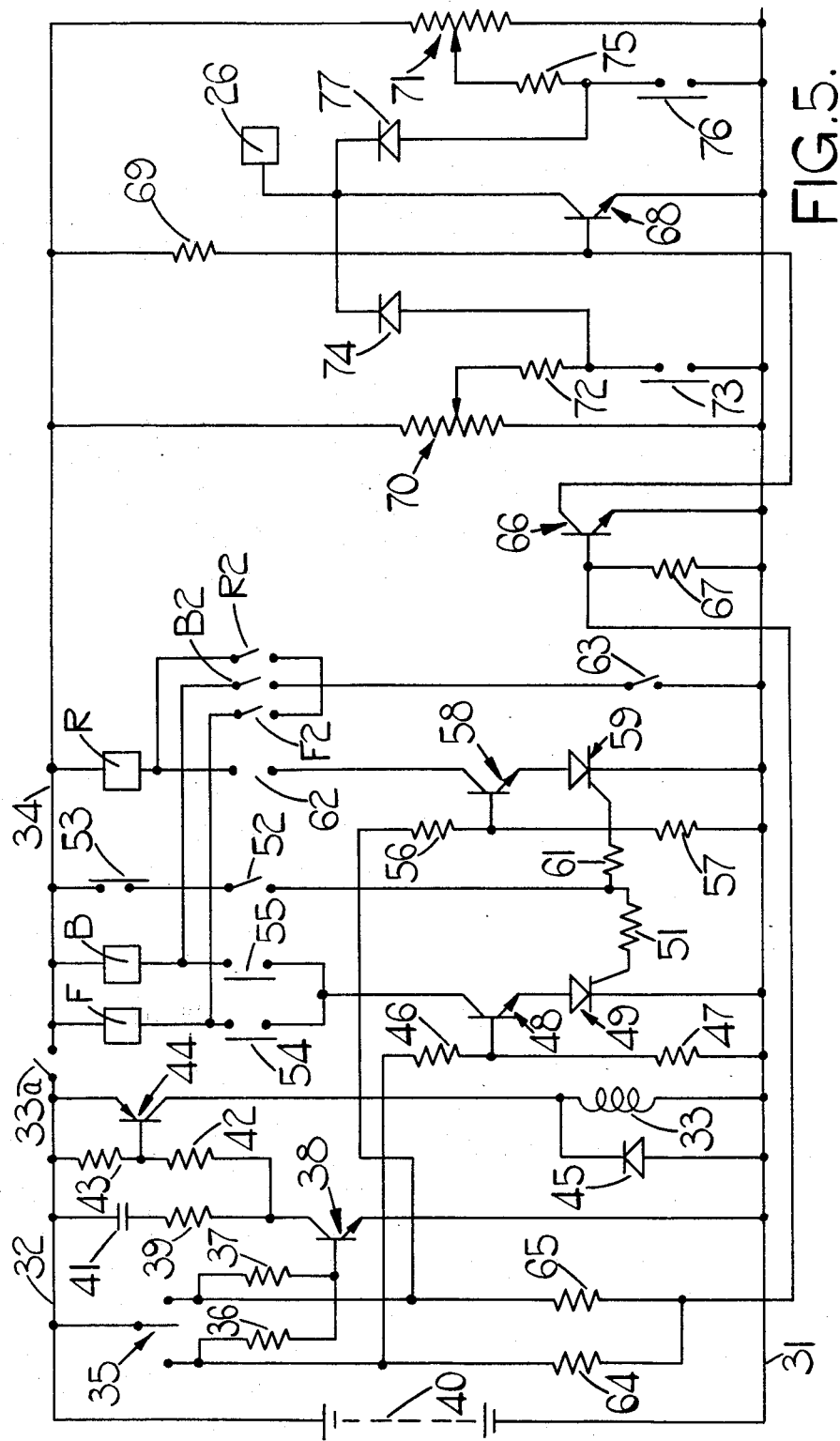

Referring now to FIG. 5, in addition to the traction battery the vehicle incorporates a further battery 40, typically at 24 volts, with its negative terminal connected to a supply line 31 and its positive terminal connected to a supply 32. The selector switch previously referred to is shown at 35, and has its movable contact connected to the line 32 and its forward and reverse fixed contacts connected through resistors 36, 37 respectively to the base of an n-p-n transistor 38, the emitter of which is connected to the line 31 and the collector of which is connected to the line 32 through a resistor 39 and a capacitor 41 in series. The resistor 39 and capacitor 41 are bridged by resistors 42, 43 in series, and the junction of the resistors 42 and 43 is connected to the base of a p-n-p transistor 44, the emitter of which is connected to the line 32 and the collector of which is connected to the line 31 through a relay winding 33 bridged by a freewheel diode 45. The relay winding 33 serves when it is energised to close a normally open contact 33a which couples the line 32 to a supply line 34.

The forward fixed contact of the switch 35 is further connected to resistors 46, 47 to the line 31, and the junction of the resistors 46, 47 is connected to the base of an n-p-n transistor 48, the emitter of which is connected to the line 31 through the anode-cathode path of a thyristor 49 the cathode of which is connected to the line 34 through a resistor 51 and switches 52, 53 in series. The switch 52 is sensitive to the speed of the vehicle, and is closed when the vehicle speed is below a predetermined value, typically 4 m.p.h. The switch 53 is controlled by the accelerator pedal of the vehicle, and is closed when the accelerator pedal is not depressed.

The collector of the transistor 48 is connected to the line 34 through parallel paths one of which contains a switch 54 and the device F (FIG. 4) and the other of which contains a switch 55 and the device B (FIG. 4). The switch 54 is a normally open switch controlled by the accelerator pedal of the vehicle. The switch 55 is a normally open switch which is closed when the brake pedal of the vehicle is depressed.

The reverse fixed contact of the switch 35 is also connected through resistors 56, 57 in series to the line 31, and the junction of the resistors 56, 57 is connected to the base of an n-p-n transistor 58 the emitter of which is connected to the line 31 through the anode-cathode path of a thyristor 59. The thyristor 59 has its gate connected to the line 34 through a resistor 61 and the switches 52 and 53 in series, and the collector of the transistor 58 is connected to the line 34 through a switch 62 and the device R in series. The switch 62 is operated by the accelerator pedal of the vehicle, and like the switch 54 closed before the switch 53 opens. Each of the devices F, B, R operates a normally open contact, the three normally open contacts being indicated at F2, B2, R2. Whenever one of the devices F, B, R is energised, it completes a self hold circuit to itself by way of its contact F2, B2 or R2 and a switch 63. The switch 63 is a current-sensitive switch which is closed whenever the current flowing in the motor armature is above a predetermined level, typically 30 amps.

The forward and reverse fixed contacts of the switch 35 are also connected through resistors 64 and 65 respectively to the base of an n-p-n transistor 66 having its emitter connected to the line 31, its base connected to the line 31 through a resistor 67 and its collector connected to the base of an n-p-n transistor 68. The transistor 68 has its emitter connected to the line 31, its base connected to the line 34 through a resistor 69 and its collector connected to the unit 26 (FIG. 1).

It will be recalled that both the accelerator pedal and brake pedal operate potentiometers, and these potentiometers are shown in FIG. 5. The accelerator pedal operates a slider movable over a resistor 70 connected between the lines 34, 31, and the brake pedal moves a slider over a resistor 71 connected between the lines 34, 31. The accelerator pedal slider is connected to the line 31 through a resistor 72 and a normally open switch 73 operable by the brake pedal of the vehicle, the junction of the resistor 72 and switch 73 being connected through a diode 74 to the unit 26. The slider movable over the resistor 71 is connected to the line 31 through a resistor 75 and a normally open switch 76 operable by the accelerator pedal of the vehicle, the junction of the resistor 75 and switch 76 being connected to the unit 26 through a diode 77.

In order to understand the operation of the circuit, assume that the switch 35 is moved to the forward position. Current flows through the resistor 36 to turn on the transistor 38, which turns on the transistor 44 and charges the capacitor 41. Conduction of the transistor 44 energises the winding 33 to close the contact 33a. Current also flows through the resistor 64 to turn on the transistor 66 which holds the transistor 68 off. Assuming that at this stage the vehicle speed is zero and the accelerator pedal is not depressed, then gate current flows to the thyristors 49 and 59, and base-emitter current flows in the transistor 48. However, no base-emitter current flows in the transistor 58, so that thyristors 49 and 59 are on and off respectively.

Assume now that the accelerator pedal of the vehicle is depressed, so that the switch 54 closes. The transistor 48 and thyristor 49 now both conduct to energise device F so that the circuit assumes the state shown in FIG. 1. The switch 53 now opens to break the gate circuits of the thyristors 49, 59, and when the vehicle speed is above the predetermined value the switch 52 also opens. However, the thyristor 49 remains conducting. The speed of the vehicle is now controlled by controlling the armature current as previously explained, a signal to the unit 26 being provided by way of the resistor 72 and diode 74. The brake pedal is not depressed at this stage, and so the switch 73 is open, but the switch 76 is closed, so ensuring that the diode 77 does not provide an input to the unit 26.

Suppose now that the switch 35 is moved to its off position. The transistor 38 turns off immediately, but the transistor 44 is held on for a predetermined period of time while the capacitor 41 discharges. During this predetermined period of time, the contact 33a does not open. Opening of the switch 35 also removed the base drive of the transistor 48, and so the transistor 48 and thyristor 49 cease to conduct whether or not the switch 54 is still held closed. However, since the device F is energized, the contact F2 is closed, and assuming that the armature current of the motor is above the predetermined level, the switch 63 is closed and so the device F remains energised during the delay period, unless the armature current falls below the predetermined level during the delay period, in which case the switch 63 opens and the device F is de-energised. As soon as the switch 35 is moved to its off position, base drive is removed from the transistor 66, which turns off so that current flowing through the resistor 69 now turns on the transistor 68, connecting the unit 26 to the line 31. Connection of the unit 26 to the line 31 represents a demand for zero armature current, and so as soon as the switch 35 is moved to its off position the armature current will start to reduce. The length of the delay period is selected so that the current will fall to 30 amps before the end of the delay, so that the switch 63 opens during the delay period. However, it is not essential in the example described to provide the switch 63 and contact F2, B2 and R2.

The operation when the switch 35 selects reverse is similar to that described. The transistor 66 is now held on by current flowing through the resistor 65, and the device R is energised in the same way as the device F as explained above.

If the vehicle is moving forwards the driver releases the accelerator pedal and presses the brake pedal, then the device B will be energised in place of the device F to provide electrical braking. If the switch 35 is then moved to its off position, the circuit will operate in exactly the same way as described above but with the contact B2 closed to hold the device B energised.

In a modification (not shown) the delay operable when the switch 35 is moved to its off position is provided by using a slow-acting relay.

Althoudh in the example described above, the switch means consists of a single switch with a central off position. However, the arrangements described are equally useful when the switch means consists of two switch, one selecting either forward or reverse, and the other being an on-off switch. Using two switches in this way the operation of the circuit is as described above.

I claim:

1. A control circuit for an electrically driven vehicle, comprising a traction motor for driving the vehicle, a regulator in circuit with the motor armature for controlling the armature current, switch means having forward and reverse positions in which the motor operates to drive the vehicle forwardly and rearwardly respectively, and an off position, the switch means also controlling the power supply to the circuit and so serving to de-energise the circuit when in its off position, delay means being provided for maintaining energisation of the circuit for a period of time when the switch means is moved to the off position.

2. A circuit as claimed in claim 1 in which the motor armature current is set by the accelerator pedal of the vehicle, and there is further provided an overriding control operable when the switch means is in its off position for reducing the armature current to a predetermined level.

3. A circuit as claimed in claim 2 in which the predetermined level is zero.

4. A circuit as claimed in claim 2 in which the switch means controls contactors determining the direction of operation of the motor, and further delay means is provided for holding the contactors closed for a predetermined period of time during which the current can reduce to the predetermined level.

5. A circuit as claimed in claim 4 in which the further delay means allows the contactors to open during the predetermined period of time if the armature current falls to a predetermed level.

6. A circuit is claimed as in claim 1 in which the switch means consists of a single switch having a central off position.

7. A circuit is claimed in claim 1 in which the switch means comprises a pair of switches, one for selecting forward and reverse and the other having on and off positions.

* * * * *